United States Patent [19]

Sakurai et al.

[11] Patent Number: 4,530,081
[45] Date of Patent: Jul. 16, 1985

[54] DOOR STRUCTURE FOR RECORD PLAYERS

[75] Inventors: Satoshi Sakurai; Yoshio Takahashi; Kunio Abe, all of Saitama, Japan

[73] Assignee: Pioneer Electronic Corporation, Tokyo, Japan

[21] Appl. No.: 435,447

[22] Filed: Oct. 20, 1982

[30] Foreign Application Priority Data

Oct. 20, 1981 [JP] Japan .......................... 56-154942[U]
Oct. 20, 1981 [JP] Japan .......................... 56-154950[U]
Oct. 20, 1981 [JP] Japan .......................... 56-154954[U]
Oct. 29, 1981 [JP] Japan .......................... 56-160337[U]
Oct. 29, 1981 [JP] Japan .......................... 56-160338[U]

[51] Int. Cl.³ ...................... G11B 17/04; G11B 23/02
[52] U.S. Cl. ..................................... 369/75.2; 312/8; 312/139; 369/75.1
[58] Field of Search ................. 369/77.1, 75.1, 75.2; 312/8, 138 R, 139

[56] References Cited

U.S. PATENT DOCUMENTS

| | | | |
|---|---|---|---|
| 1,388,243 | 8/1921 | Dragner et al. | 369/75.1 |
| 3,521,888 | 7/1970 | Kaneda | 360/95 |
| 4,216,969 | 8/1980 | Allen | 369/77.2 |
| 4,408,321 | 10/1983 | Tamamura | 369/77.2 |

Primary Examiner—Steven L. Stephan
Attorney, Agent, or Firm—Sughrue, Mion, Zinn, Macpeak & Seas

[57] ABSTRACT

A record player comprises a player cabinet and a slide base supporting a turntable and movably mounted in the player cabinet for movement into and out of the latter. The record player also includes a front door movably supported by the player cabinet for movement between a vertical position in which the front door closes an open front face of the player cabinet and a horizontal position within the player cabinet. When the front door is opened, it is withdrawn back into the player cabinet so that the front door will not interfere with operator's activities to manipulate the record player. The front door may be pivotably supported by swing levers so that the front door can easily be opened and closed without striking a top plate of the player cabinet. The front door may be actuated by a mechanism operatively connected to a substantially central portion of the front door laterally thereof for smoothly actuating the front door without distorting the front door while it is being opened or closed. The slide base may support thereon a slide base drive mechanism for selectively actuating the front door and the slide base in a timed relationship to each other.

11 Claims, 17 Drawing Figures

DOOR STRUCTURE FOR RECORD PLAYERS

BACKGROUND OF THE INVENTION

The present invention relates to a record player, and more particularly to a door structure for a record player in which a slide base supporting a turntable thereon is movable into and out of a cabinet of the record player through a front face thereof.

There has heretofore been known a record player having a turntable movable into and out of a player cabinet to reduce a vertical dimension of the record player so that a wider space is available especially above the record player. In use, a front door of the player cabinet is angularly lifted, and the turntable is pulled forward out of the player cabinet.

The known record player is disadvantageous in that the front door as it projects forward above the turntable during use interferes with operator's actitivies to change record discs or operate the tone arm. For trouble-free operation, the turntable should be pulled out after the front door has been fully opened. When the turntable operates out of timed relationship to the front door, however, the turntable tends to hit the front door, resulting in malfunctioning of the record player.

SUMMARY OF THE INVENTION

It is a major object of the present invention to provide a record player having a front door which can be withdrawn to a position in which the front door does not interfere with any activities to operate the record player.

Another object of the present invention is to provide a record player having a simple mechanism for reliably moving a front door without hitting a top plate of a player cabinet within a limited space available therein.

Still another object of the present invention is to provide a record player including a simple mechanism for opening and closing a front door smoothly.

A still further object of the present invention is to provide a record player in which a front door can be opened or closed in timed relationship to movement of a slide base on which a turntable is mounted.

According to the present invention, a record player comprises a player cabinet and a slide base supporting a turntable thereon and movably mounted in the player cabinet for movement into and out of the latter. The record player also includes a front door movably supported by the player cabinet for movement between a vertical position in which the front door closes an open front face of the player cabinet and a horizontal position within the player cabinet. When the front door is opened, it is withdrawn back into the player cabinet so that the front door will not interfere with operator's activities to manipulate the record player.

According to another embodiment, the front door is pivotably supported by a pair of swing levers on each side of the front door for movement between the vertical and horizontal positions. When the front door is opened, the upper end of the front door is first inclined rearward from the vertical position, and then the front door is bodily turned upwardly to the horizontal position. Thus, the front door can easily be opened and closed without hitting a top plate of the player cabinet in a limited space within the player cabinet.

According to still another embodiment, a mechanism for opening and closing the front door is operatively connected to a substantially central portion of the front door laterally thereof. The front door can be moved by the mechanism between the vertical and horizontal positions in response to movement of the slide base. The mechanism can open and close the front door smoothly without imposing undue forces thereon.

According to a still further embodiment, the slide base supports thereon a slide base drive mechanism for selectively actuating the front door and the slide base for their movements. When the front door is opened or closed, it is actuated in timed relationship to movement of the slide base.

The above and other objects, features and advantages of the present invention will become more apparent from the following description when taken in conjunction with the accompanying drawings in which preferred embodiments of the present invention are shown by way of illustrative example.

DETAILED DESCRIPTION

A door structure according to a first embodiment of the present invention will be described with reference to FIG. 1.

A slide base 2 with a turntable 1 mounted thereon is movably supported in a player cabinet 3 for back and forth movement in the leftward and rightward directions as shown. A front door 4 is positioned to cover a front opening above the slide base 2 and has upper and lower guide pins 5, 6 received in guide slots 7 defined in opposite sidewalls of the player cabinet 3 so that the front door 4 can be moved angularly and slidably along the guide slots 7. The guide slots 7 are substantially in the shape of a Y including a long horizontal portion and upper and lower front branches connected thereto.

For opening the front door 4, the upper end thereof is pushed to the right as shown to allow the upper guide pins 5 to slide along the guide slots 7 in the direction of the arrow A. Then, the front door 4 is pushed rearward as it is bodily lifted while the guide pins 5, 6 are being slid in the direction of the arrow B until the front door 4 is displaced to the horizontal position as shown by the phantom lines.

Thereafter, the slide base 2 is moved forward in the direction of the arrow C out of the player cabinet 3, and a record disc (not shown) is placed on the turntable 1. The record disc is played on the turntable 1 as it is positioned out of the player cabinet 3 or as it is retracted into the player cabinet 3. At this time, the front door 4 is withdrawn back into the player cabinet 3, it does not interfere with replacement of record discs or operation of a tone arm (not shown).

After the record disc has been played, the slide base 2 is stored into the illustrated position and the front door 4 is moved back to the closed position as shown by the solid lines in a process which is a reversal of the manner in which the front door 4 has been opened.

Figure 2:
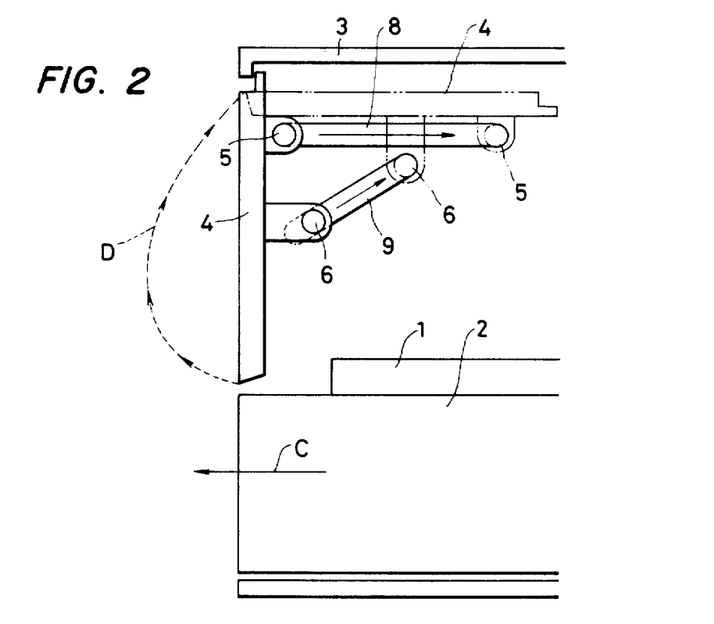
FIG. 2 is a side elevational view of an internal mechanism of a door structure according to a second embodiment of the present invention.

FIG. 2 shows a door structure according to a second embodiment of the present invention.

Figure 1:
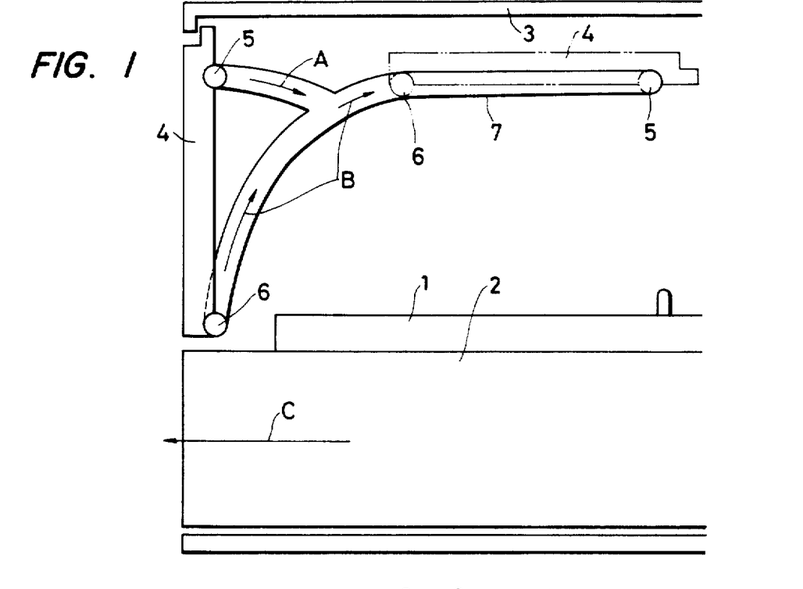
FIG. 1 is a side elevational view of an internal mechanism of a door structure according to a first embodiment of the present invention.

The door structure illustrated in FIG. 2 differs from the door structure of FIG. 1 in that upper and lower guide pins 5, 6 are received respectively in a horizontal guide slot 8 and an inclined guide slot 9, respectively, and the lower guide pins 6 are higher in position than those shown in FIG. 1.

When a front door 4 is opened or closed, it moves outwardly of the player cabinet with a lower end of the front door following a path as illustrated by the dotted line D. Such movement of the front door 4 allows a larger space of accommodation to be retained in the player cabinet, and an arrangement of various parts in the player cabinet can easily be designed.

The horizontal and inclined guide slots 8, 9 may not necessarily be rectilinear in shape.

With the above record players, the slide base on which the turntable is mounted is movably supported in the player cabinet for back and forth movement, and the front door is mounted for movement between a vertical position in which the front door covers the front opening in the player cabinet and a horizontal position within the player cabinet. When the front door is opened, it can be withdrawn into the player cabinet so that the front door will not interfere with activities to operate the record player. The front door may be arranged to be opened and closed in a ganged relation to movement of the slide base.

A door structure according to a third embodiment will now be described with reference to FIGS. 3 through 5.

A slide base 2 with a turntable 1 mounted thereon is movably supported in a player cabinet 3 for back and forth movement in the leftward and rightward directions as shown. The front door 4 has a pair of upper and lower pivot pins 5, 6 projecting from each side of the front door 4 and pivotably supported on a pair of first and second swing levers 107, 110. The front door 4 is thus movable by the swing levers 107, 110 between a vertical position as shown in FIG. 3 and a horizontal position as shown in FIG. 5.

The first swing lever 107 which pivotably supports the lower pivot pin 6 is swingably supported substantially at its central portion on a sidewall of the player cabinet 3 and is normally urged to turn counterclockwise as shown by a spring 109 acting between the player cabinet 3 and the first swing lever 107. The second swing lever 110 is swingably supported substantially at its central portion on the first swing lever 107 and is normally urged to turn counterclockwise as shown by a spring 111 acting between the first and second swing levers 107, 110. The second swing lever 110 has in its distal end portion an oblong hole 112 in which the upper pivot pin 5 is received.

A slide lever 113 is supported on at least one of the sidewalls of the player cabinet 3 for back and forth movement, the slide lever 113 having first and second pins 114, 115 projecting laterally therefrom. When the slide lever 113 is moved forward, the first and second pins 114, 115 are brought into abutment against lower abutment end portions 107a, 110a, respectively, of the first and second swing levers 107, 110.

Figure 3:
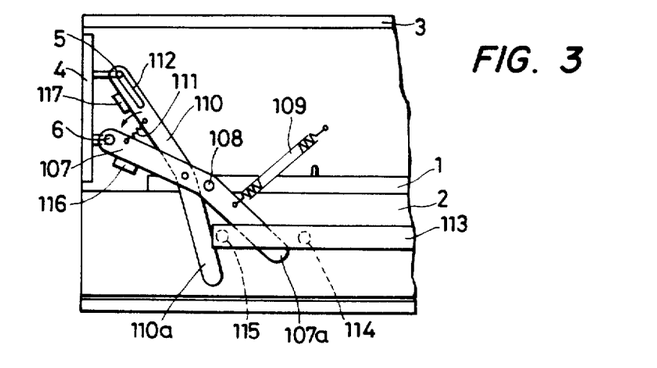
FIGS. 3 through 5 are side elevational views of an internal mechanism of a door structure according to a third embodiment, the views showing a front door in vertical, inclined and horizontal positions, respectively.
Figure 4:
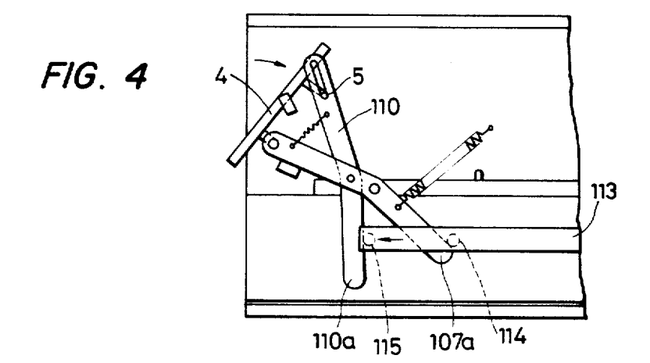
Figure 5:
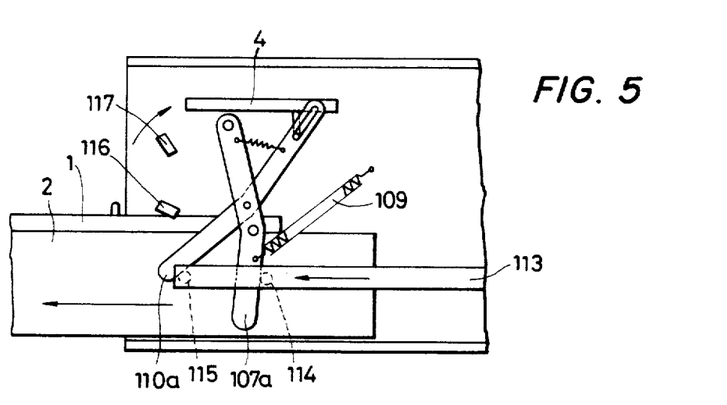

The door structure as illustrated in FIGS. 3 through 5 will operate as follows:

When the slide lever 113 is moved in the forward direction manually or by a drive mechanism (not shown) from the stored position as shown in FIG. 3, the second pin 115 contacts the lower abutment end portion 110a of the second swing lever 110 to turn the latter clockwise, whereupon the upper pivot pin 5 of the front door 4 moves downwardly along the oblong hole 112 to thereby incline the front door 4 rearward to the position illustrated in FIG. 4. Continued forward movement of the slide lever 113 causes the first pin 114 to contact and turn the lower abutment end portion 107a of the first swing lever 107. The front door 4 is elevated as it is angularly moved to the horizontal position as shown in FIG. 5 in which the front door 4 is stopped.

With the slide base 2 moved forward manually or by the drive mechanism, the record player can now be used for playing a record disc. Since the front door 4 is retracted back into the player cabinet 3, record discs can easily be replaced, and the tone arm can be manipulated with ease.

After the record disc has been played, the slide base 2 is displaced rearward back to the stored position, and then the slide lever 113 is retracted back. The front door 4 is moved back to the vertical position (FIG. 3) in an reversed process. The pins 114, 115 on the slide lever 113 disengage from the abutment end portions 107a, 110a, whereupon the swing levers 107, 110 are turned under the resiliency of the springs 109, 111 into abutment against stops 116, 117, respectively. The front door 4 is now in the closed position as shown in FIG. 3.

With the door structure shown in FIGS. 3 through 5, the front door is supported by the swing levers for movement between the vertical position in which the front door covers the front opening in the player cabinet and the horizontal position within the player cabinet. When the front door is to be opened, its upper end is first inclined rearward, and then the front door is bodily lifted toward the horizontal position in the player cabinet. The front door can therefore be opened and closed reliably without engaging a top plate of the player cabinet even with only a limited space available for storing the front door in the player cabinet.

The front door is of an elongated configuration in the transverse direction of the player cabinet. When only one end of such a front door is pushed or pulled so as to be opened or closed, the front door is subjected to a torsional force and cannot smoothly be opened or closed. Simultaneous application of forces to both ends of the front door to open and close the same would eliminate such a problem, but would require complicated drive mechanisms for opening and closing the front door. An adjustment procedure would be needed to allow the drive mechanisms to be actuated in a time relationship.

Figure 6:
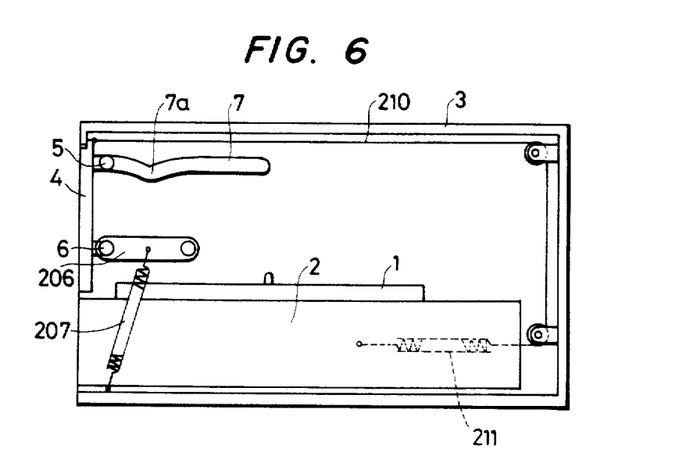
FIGS. 6 and 7 are side elevational views of an internal mechanism of a door structure according to a fourth embodiment, the views showing a front door in vertical and horizontal positions, respectively.
Figure 7:
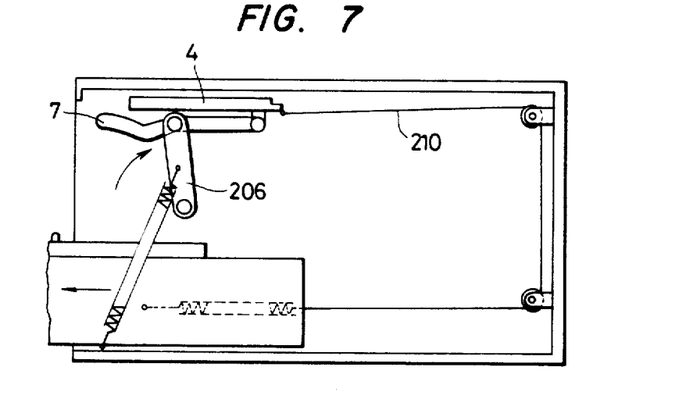
Figure 8:
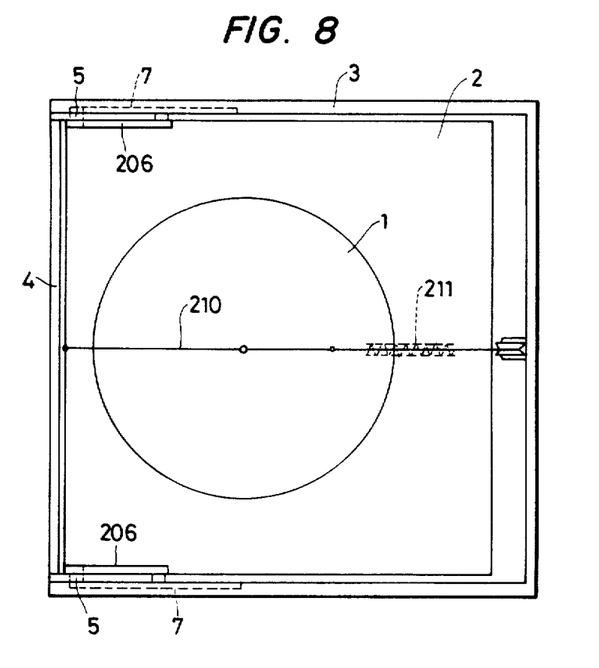
FIG. 8 is a plan view of the internal mechanism shown in FIGS. 6 and 7, showing the front door in the vertical position.

FIGS. 6 through 8 show a door structure according to a fourth embodiment which has been designed to overcome the above shortcoming.

A slide base 2 with a turntable 1 mounted thereon is movably supported in a player cabinet 3 for back and forth movement in the leftward and rightward directions as shown. A front door 4 of a transversely elongated shape is positioned in covering relation to the front opening in the player cabinet 3 and has a pair of lateral pivot pins 6 which are pivotably coupled respectively to swing arms 206 swingably mounted respectively to sidewalls of the player cabinet 3. The swing arms 206 are normally urged by springs 207 in a direction to close the front door 4. A pair of guide pins 5 are attached to the front door 4 upwardly of the pivot pins 6 and are received respectively in substantially horizontal guide slots 7 defined respectively in the sidewalls of the player cabinet 3. The front door 4 is thus supported by the pivot pins 6 and the guide pins 5 for angular and slidable movement. Each of the guide slots 7 is composed of a long horizontal portion and a bent portion 7a located slightly rearward of a front end of the guide slot 7 and displaced downwardly.

A wire 210 has one end fastened to a substantially central upper portion (FIG. 8) of the front door 4 and the other end connected to the slide base 2 through a spring 211 having a spring constant larger than that of the spring 207, the wire 210 extending along a top plate of the player cabinet 3 and around two pulleys supported by the player cabinet 3.

Operation of the door structure of FIGS. 6 through 8 is as follows:

When the slide base 2 is moved forward (to the left as shown) manually or by a drive mechanism (not illustrated) from the stored position of FIG. 6, the front door 4 is pulled back by the wire 210 to allow its upper end to be spaced from the top plate of the player cabinet 3. The swing arm 206 is swung clockwise as shown with the spring 207 being elongated, during which time the front door 4 is angularly moved back and elevated to the horizontal position as shown in FIG. 7. On further forward movement of the slide base 2, the spring 211 is then elongated to permit the slide base 2 to be moved out to a position in which the record player is available for playing record discs.

On completion of recording playing, the slide base 2 is moved back into the player cabinet to return the front door 4 to the vertical position as illustrated in FIG. 6 in a process which is a reversal of the procedure for opening the front door 4.

Since the wire 210 is connected to the central portion of the front door 4 laterally thereof, the front door 4 can smoothly be opened or closed without being subjected to undue forces applied.

The door structure of the record player according to the fourth embodiment of FIGS. 6 through 8 is advantageous in that the wire is connected substantially centrally to the front door for moving the latter smoothly between the vertical position covering the front opening in the player cabinet and the horizontal position in the player cabinet. Such smooth movement of the front door can be effected by a relatively simple mechanism. Like the preceding embodiments, when the turntable is moved out of the player cabinet, the front door is withdrawn into the player cabinet and hence does not interfere with activities to play record discs or manipulate the tone arm.

While in the illustrated embodiment of FIGS. 6 through 8 the front door is movably supported by the swing arms and the guide slots, other support constructions may be employed such as upper and lower swing arms, upper and lower guide slots, or guide slots having front branches, as with the first through third embodiments described above. The wire may be replaced with other drive power transmitting means such as a lever slidable back and forth and coupled with the front door and a swingable lever by which the slidable lever is operatively connected to the slide base. Ganged movement between the front door and the slide base may also be controlled by an electronic circuit so that the drive mechanism can further be simplified.

A door structure according to a fifth embodiment will now be described with reference to FIGS. 9 through 15.

Figure 9:
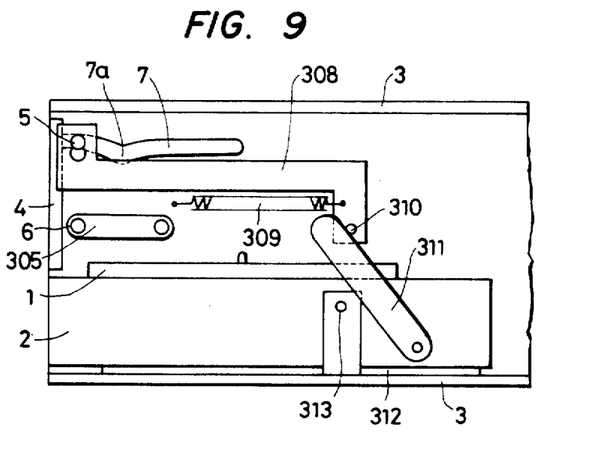
FIGS. 9 and 10 are side elevational views of an internal mechanism of a door structure according to a fifth embodiment of the present invention, the views being illustrative of operation of the internal mechanism.
Figure 10:
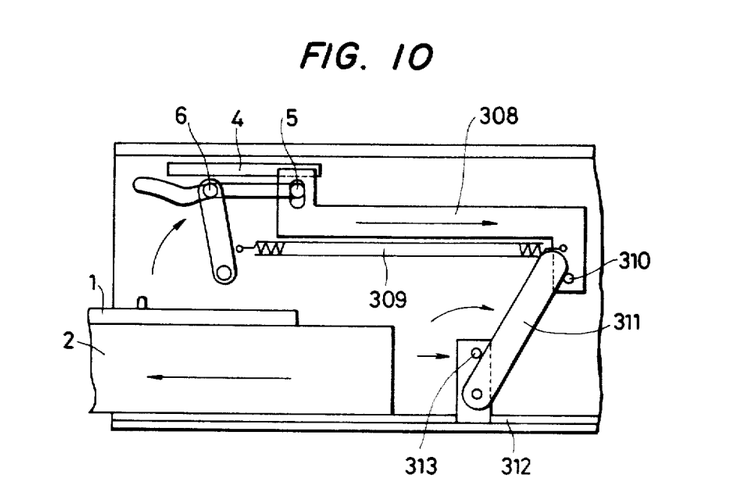

In FIG. 9, a front door 4 is pivotably supported at its lateral lower ends by distal ends of swing arms 305 pivotably mounted on sidewalls of a player cabinet 3. The front door 4 has guide pins 5 projecting from upper lateral ends and received respectively in guide slots 7 defined respectively in the sidewalls of the player cabinet 3. Each of the guide slots 7 includes a long horizontal portion and a bent portion 7a located slightly rearward of a front end of the guide slot and displaced downwardly. A slide lever 38 is supported on one of the sidewalls of the player cabinet 3 for back and forth movement, and is normally biased to move forward under the resiliency of a spring 309. The slide lever 308 has in its front end a vertical oblong hole in which one of the guide pins 5 is fitted and also has on its rear end a pin 310 held in abutment against a swing lever 311 pivotably mounted on the sidewall of the player cabinet 3. A rack gear 312 is supported on a bottom plate of the player cabinet 3 for back and forth movement. When the rack gear 312 is moved back as shown in FIG. 10, a pin 313 projecting from a bent portion extending from the rack gear 312 is brought into engagement with the swing lever 311 to turn the latter rearward.

As shown in FIGS. 11 through 15, the rack gear 312 is held in mesh with a drive gear 314 of a slide base drive mechanism mounted on the slide base 2 for back and forth driven movement with respect to the slide base 2. A lock lever 315 is swingably supported on the bottom plate of the player cabinet 3 and has a pair of lock pins 315a, 315b on its distal end, the lock lever 315 having its pivot shaft received in an L-shaped groove 316 in the rack gear 312. The lock pins 315a, 315b on the lock lever 315 are alternately fittable in a recess 2a defined in the slide base 2 and and a recess 316b in the L-shaped groove 316 for locking the slide base 2 or the rack gear 312 with respect to the player cabinet 3.

A reset lever 318 is operatively connected by a reset spring 317 to the lock lever 315 and is swingably supported on the bottom plate of the player cabinet 3. The reset lever 318 can be turned by a reset member 319 on the slide base 2 and a reset pin 320 on the rack gear 312.

Figure 11:
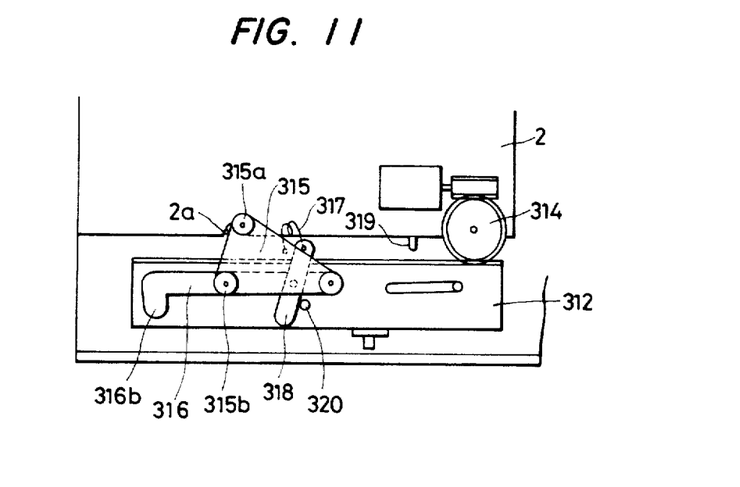
FIGS. 11 through 15 are plan views of the internal mechanism of FIGS. 9 and 10, showing operation of a slide base and a rack gear.
Figure 12:
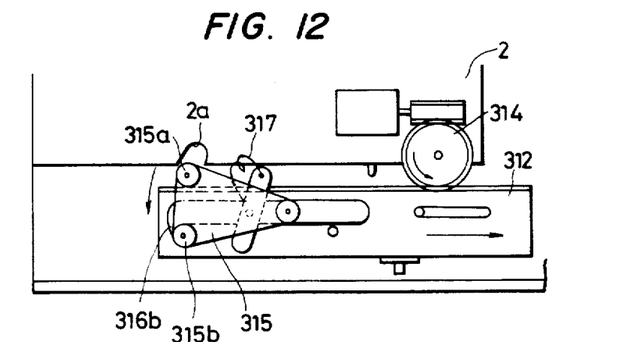

The door structure thus constructed will operate as follows:

In the stored position as shown in FIGS. 9 and 11, the front opening in the player cabinet 3 is closed by the front door 4, and the lock pin 315a of the lock lever 315 is fitted in the recess 2a in the slide base 2 to lock the slide base 2 with respect to the player cabinet 3. When a slide base unloading switch (not shown) is depressed, the drive gear 314 is rotated counterclockwise as shown to move the rack gear 312 rearward for thereby displacing the slide lever 308 in the rearward direction through the pin 313, the swing lever 311, and the pin 310. The upper end of the front door 4 is then inclined rearward away from the top plate of the player cabinet 3, and the front door 4 is bodily raised as it turns backward until it reaches the horizontal position as illustrated in FIG. 10 within the player cabinet 3.

Figure 13:
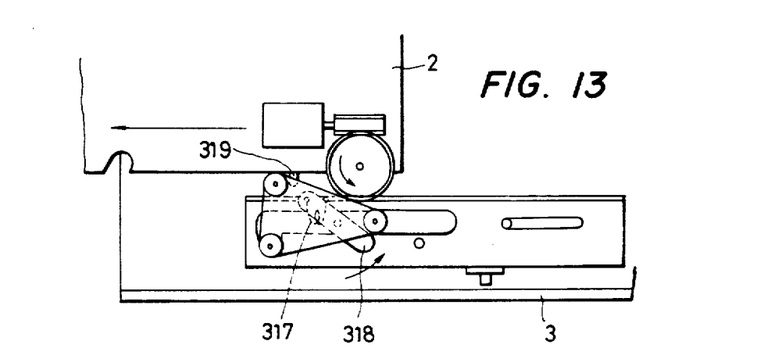

Since the lock lever 315 is urged by the reset spring 317 to turn counterclockwise, the lock pin 315b is moved into the recess 316b when the rack gear 315b is displaced fully back to thereby lock the rack gear 315b with respect to the player cabinet 3. The lock pin 315a is moved out of the recess 2a in the slide base 2, which is then released from the player cabinet 3. Continued rotation of the drive gear 314 causes the slide base 2 to move forward, during which time the reset member 319 turns the reset lever 318 counterclockwise. The slide base 2 now arrives at the position as shown in FIGS. 10 and 13, in which a record disc can be placed onto or removed from the turntable 1 on the slide base 2.

In this position, the turntable 1 projects out of the player cabinet 3, and the front door 4 is withdrawn into the player cabinet 3 without interfering operator's activities for an exchange of record discs or operation of the tone arm.

Figure 14:
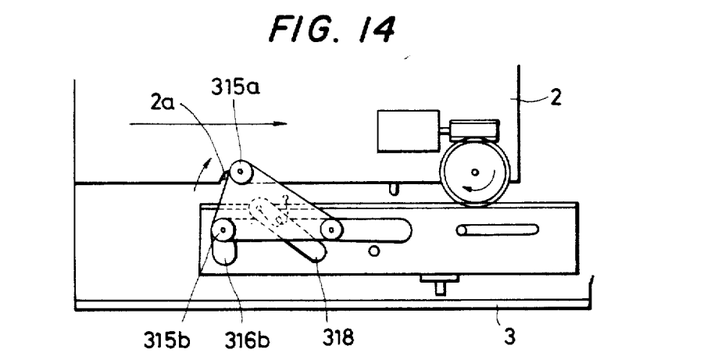

When a record disc has been played, a slide base loading switch (not shown) is pushed to enable the drive gear 314 to rotate clockwise to retract the slide base 2 back to the stored position. Since the reset lever 318 has been turned counterclockwise and the lock lever 315 is biased clockwise under the force of the reset spring 317, the lock pin 315a is brought into the recess 2a to lock the slide base 2 with respect to the player cabinet 3 as shown in FIG. 14.

On continued rotation of the drive gear 314, the rack gear 312 moves forward followed by forward movement of the slide lever 308 under the resiliency of the spring 309 until the front door 4 is returned to the vertical position as illustrated in FIG. 9.

Figure 15:
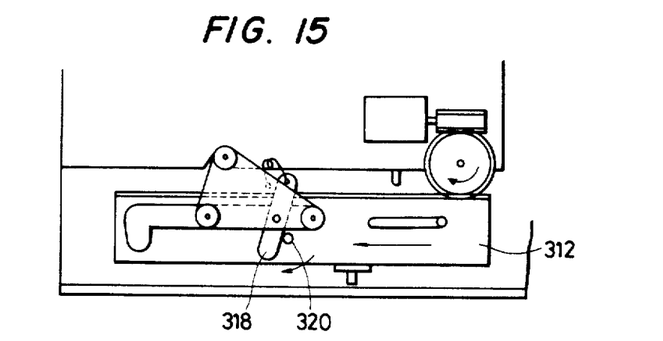

As shown in FIG. 15, the rack gear 312 is stopped after having caused the reset pin 320 to turn the reset lever 318 clockwise. The slide base 2 is now in the stored position in the player cabinet 3.

With the arrangement of FIGS. 9 through 15, the front door is movable between the vertical position in which the front door covers the front opening in the player cabinet and the horizontal position within the player cabinet. The front door and the slide base are selectively actuated for their movements by the slide base drive mechanism mounted on the slide base. When the front door is withdrawn into the player cabinet, the front door does not interfere with operator's activities to manipulate the record player. The single slide base drive mechanism can selectively actuate the front door and the slide base smoothly in a timed relationship.

Figure 16:
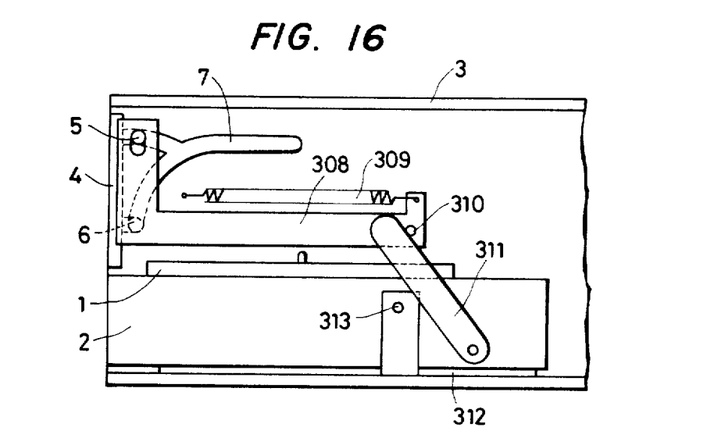
FIGS. 16 and 17 are side elevational views of a modified internal mechanism, illustrating operation of a front door.
Figure 17:
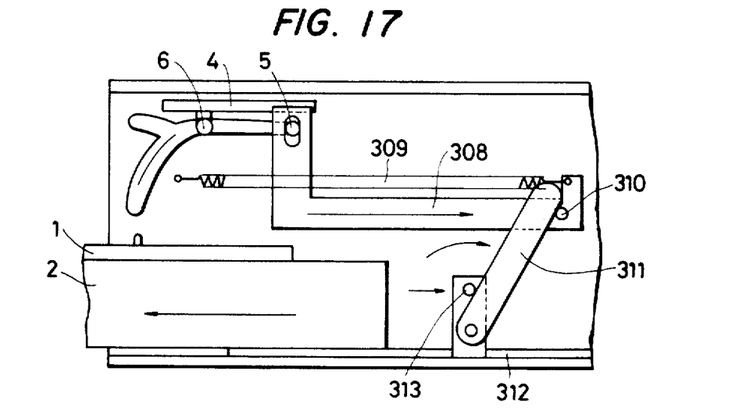

A modified door structure will be described with reference to FIGS. 16 and 17. In FIG. 16, a front door 4 is normally positioned in covering relation to a front opening in a player cabinet 3 above a slide base 2. The front door 4 has on its each side a pair of upper and lower guide pins 5, 6 received in a guide slot 7 defined in each of sidewalls of the player cabinet 3 for angular and slidable movement.

The guide slot 7 is composed of a horizontal portion and front upper and lower branches connected thereto. When the front door 4 is in the closed or vertical position as shown in FIG. 16, the upper and lower guide pins 5, 6 are fitted respectively in the upper and lower branches of the guide slot 7.

A slide lever 308 is supported on one of the sidewalls of the player cabinet 3 for back and forth movement, the slide lever 308 being normally urged forward by a spring 309. The slide lever 308 has in its front end a vertical oblong hole in which the one of the upper guide pins 305 is received and on its rear end a pin 310 engaging a swing lever 311 pivotably supported on the sidewall of the player cabinet 3.

A rack gear 312 is supported on a bottom plate of the player cabinet 3 so as to be movable back and forth. When the rack gear 312 is moved back as shown in FIG. 17, a pin 313 projecting from a bent member extending from the rack gear 312 is brought into abutting engagement with the swing lever 311. The rack gear 312 may be of the same construction as that of the rack gear as shown in FIGS. 11 through 15. The door structure illustrated in FIGS. 16 and 17 operates in the same manner as that of the door structure shown in FIGS. 9 through 15, and is as advantageous as the latter.

Although certain preferred embodiments have been shown and described, it should be understood that many changes and modifications may be made therein without departing from the scope of the appended claims.

What is claimed is:

1. A record player comprising:
   a player cabinet having an open front face and sidewalls wherein each sidewall has substantially horizontal guide slots respectively, and each guide slot includes two branches;
   a slide base movably mounted in said play cabinet for movement into and out of the latter and supporting a turntable thereon; and
   a front door having upper and lower guide pins projecting from each of both sides thereof and movably received respectively in said guide slots and said front branches thereof, said guide pins on each side of said front door are associated with the slots in a sidewall proximate thereto such that said upper guide pin on a side is movable in one of said two branches and said lower guide pin on a side is movable in the other of said two branches, said front door being movable between a vertical position in which said front door covers said open face and a horizontal position within said player cabinet such that said upper guide pins move in a first branch of said two front branches and said lower guide pins move in a second branch of said two front branches.

2. A record player comprising:
   a player cabinet having an open front face and a sidewall;
   a slide base movabley mounted in said player cabinet for movement into and out of the latter and supporting a turntable thereon;
   a front door having a pair of first and second pivot pins on each side thereof and movable between a vertical position in which said front door covers said open front face and a horizontal position within said player cabinet;
   a first swing lever pivotably supported substantially centrally on said sidewall of the player cabinet, said first pivot pin of said front door being pivotably supported on one end of said first swing lever, said first swing lever having on the other end thereof a first abutment portion;

a second swing lever pivotably supported substantially centrally on said first swing lever, said second pivot pin of said front door being pivotably supported on one end of said second swing lever, said second swing lever having on the other end thereof a second abutment portion; and a slide lever supported on said player cabinet for back and forth movement and having a pair of first and second engagement members engageable respectively with said first and second abutment portions, the arrangement being that when said slide lever is moved forward, said second engagement member abuts against said second abutment portion to incline said front door rearward from said vertical position, and then said first engagement member abuts against said first abutment portion to move said front door toward said horizontal position.

3. A record player according to claim 2, wherein said second swing lever has an oblong hole in which said second pivot pin on said front cover is received.

4. A record player comprising:
a player cabinet having an open front face and at least one pulley connected to said cabinet;
a slide base movably mounted in said player cabinet for movement into and out of the latter and having a turntable thereon;
a front door movably supported in said player cabinet and movable between a vertical position in which said front door covers said open front face and a horizontal position within said player cabinet; and
a front door opening and closing mechanism comprising a wire connected to at least one spring, one end of said wire and spring being secured to a substantially central portion of said front door laterally thereof and secured at an opposite end to said slide base, said wire passing over at least one said pulley secured to said player cabinet, said opening and closing mechanism moving said front door between said vertical and horizontal positions in response to movement of said slide base.

5. A record player comprising:
a player cabinet having a open front face and sidewalls having substantially horizontal guide slots, respectively;
a pair of swing arms pivotably supported on said sidewalls, respectivey;
a slide base movably supported in said player cabinet for movement into and out of the latter and supporting a turntable and a slide base drive mechanism thereon;
a rack gear movably mounted in said player cabinet and actuatable by said slide base drive mechanism for movement parallel to said slide base; and
a front door having guide pins projecting from both sides thereof and movably received respectively in said guide slots, said front door being pivotably supported on said swing arms, respectively, at distal ends thereof for movement between a vertical position in which said front door covers said open front face of the player cabinet and a horizontal position within said player cabinet in response to movement of said rack gear, said front door and said slide base being selectively actuatable for their movements by said slide base drive mechanism.

6. A record player comprising:
a player cabinet having an open front face, a bottom plate and sidewalls having substantially horizontal guide slots, respectively, each including two front branches;
a slide base movably supported in said player cabinet for movement into and out of the latter and supporting a turntable and a slide base drive mechanism thereon;
a rack gear movably mounted in said player cabinet and actuatable by said slide base drive mechanism for movement parallel to said slide base; and
a front door having two guide pins projecting from each of both sides thereof and movably received respectively in said guide slots and said front branches thereof, said front door being movable between a vertical position in which said front door covers said open front face of the player cabinet and a horizontal position within said player cabinet in response to movement of said rack gear, said front door and said slide base being selectively actuatable for their movements by said slide base drive mechanism.

7. The record player of claim 6 further comprising means for locking said slide base with respect to said player cabinet.

8. The record player of claim 6 further including a lock means comprising a lever switchably supported on said bottom plate of said player cabinet said lever having a pair of lock pins on a distal end thereof, said rack gear having a groove therein, said lever having a pivot shaft received in said groove in said rack gear, said slide base having a recess therein, wherein said lever is spring biased such that said pins are alternately fitted in a recess defined in said slide base or a recess in said rack gear.

9. A record player comprising:
a player cabinet having an open front face and sidewalls having substantially horizontal guide slots, respectively;
a pair of swing arms pivotably supported on said sidewalls, respectively;
a slide base movably supported in said player cabinet for movement into and out of the latter and supporting a turntable and a slide base drive mechanism thereon;
a rack gear movably mounted in said player cabinet and actuatable by said slide base drive mechanism for movement parallel to said slide base;
a front door having guide pins projecting from both sides thereof and movably received respectively in said guide slots; and
a slide lever supported on one of said sidewalls of said player cabinet having a hole in one end in which one of said guide pins is received and a pin in the other end for abutment against a swing lever pivotably mounted on said one sidewall; and
a means for engaging said swing lever with said rack gear;
said front door being pivotably supported on said swing arms, respectively, at distal ends thereof for movement between a vertical position in which said front door covers said open front face of the player cabinet and a horizontal position within said player cabinet in response to movement of said rack gear, said front door and said slide base being selectively actuatable for their movements by said slide base drive mechanism.

10. A record player comprising:

a player cabinet having an open front face and sidewalls having substantially horizontal guide slots, respectively, each including two front branches;

a slide base movably supported in said player cabinet for movement into and out of the latter and supporting a turntable and a slide base drive mechanism thereon;

a rack gear movably mounted in said player cabinet and actuatable by said slide base drive mechanism for movement parallel to said slide base; and a front door having two guide pins projecting from each of both sides thereof and movably received respectively in said guide slots and said front branches thereof; and a slide lever supported on one of said sidewalls of said player cabinet having a hole in one end in which an upper one of said two guide pins on a side of said front door is received and a pin in the other end for engaging a swing lever pivotably mounted on said one sidewall; and a means for engaging said swing lever with said rack gear;

said front door being movable between a vertical position in which said front door covers said open front face of the player cabinet and a horizontal position within said player cabinet in response to movement of said rack gear, said front door and said slide base being selectively actuatable for their movements by said slide base drive mechanism.

11. The record player of claim 10 wherein a reset lever is operatively connected to a locking lever and swingably supported on said bottom plate of said cabinet wherein said reset lever engages a reset member on a lower surface of said slide base.

* * * * *